Jan. 27, 1970 W. K. SCHULZE 3,491,625
FLOATING TOOL HOLDER
Filed June 29, 1967 4 Sheets-Sheet 3
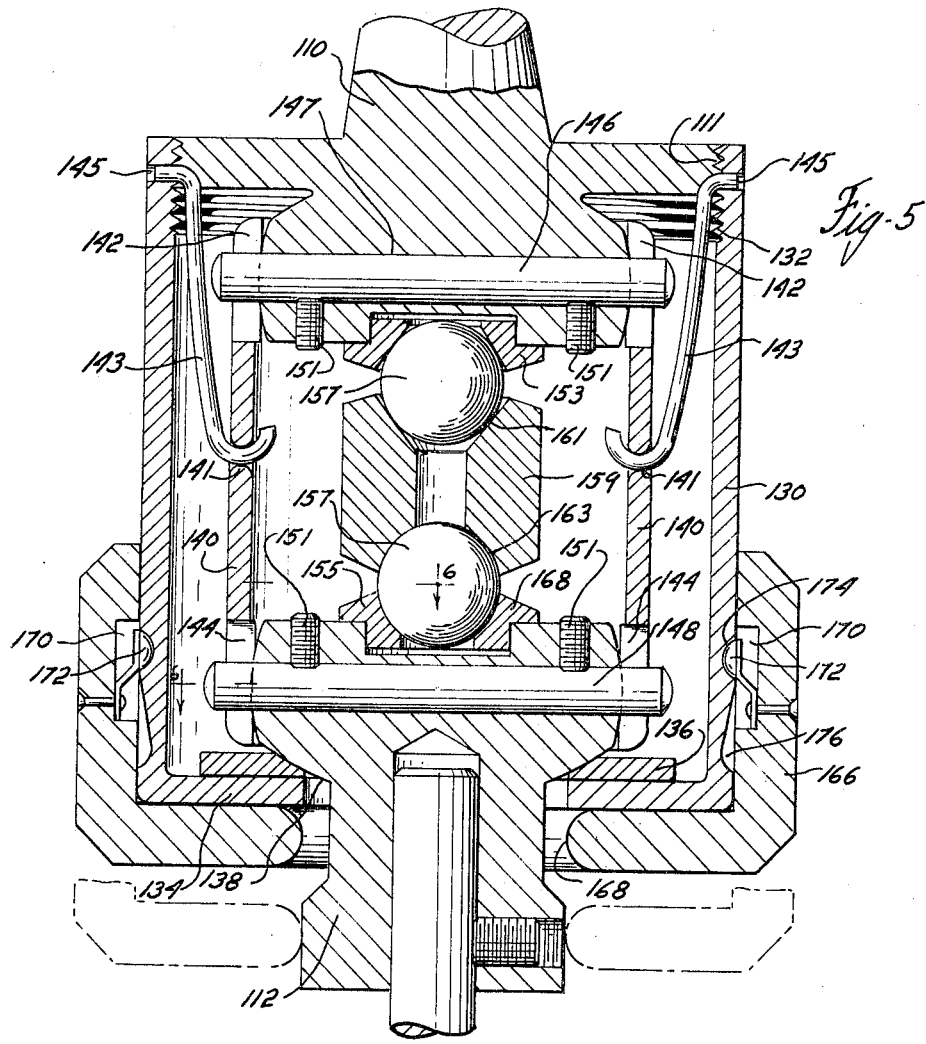
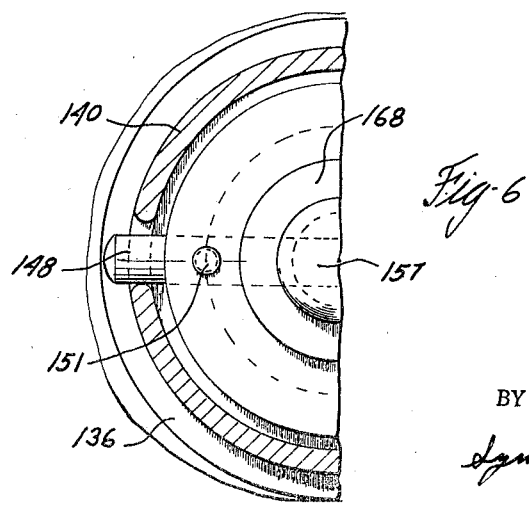
INVENTOR.
Wilhelm K. Schulze
BY
Synnestvedt & Lechner
ATTORNEYS

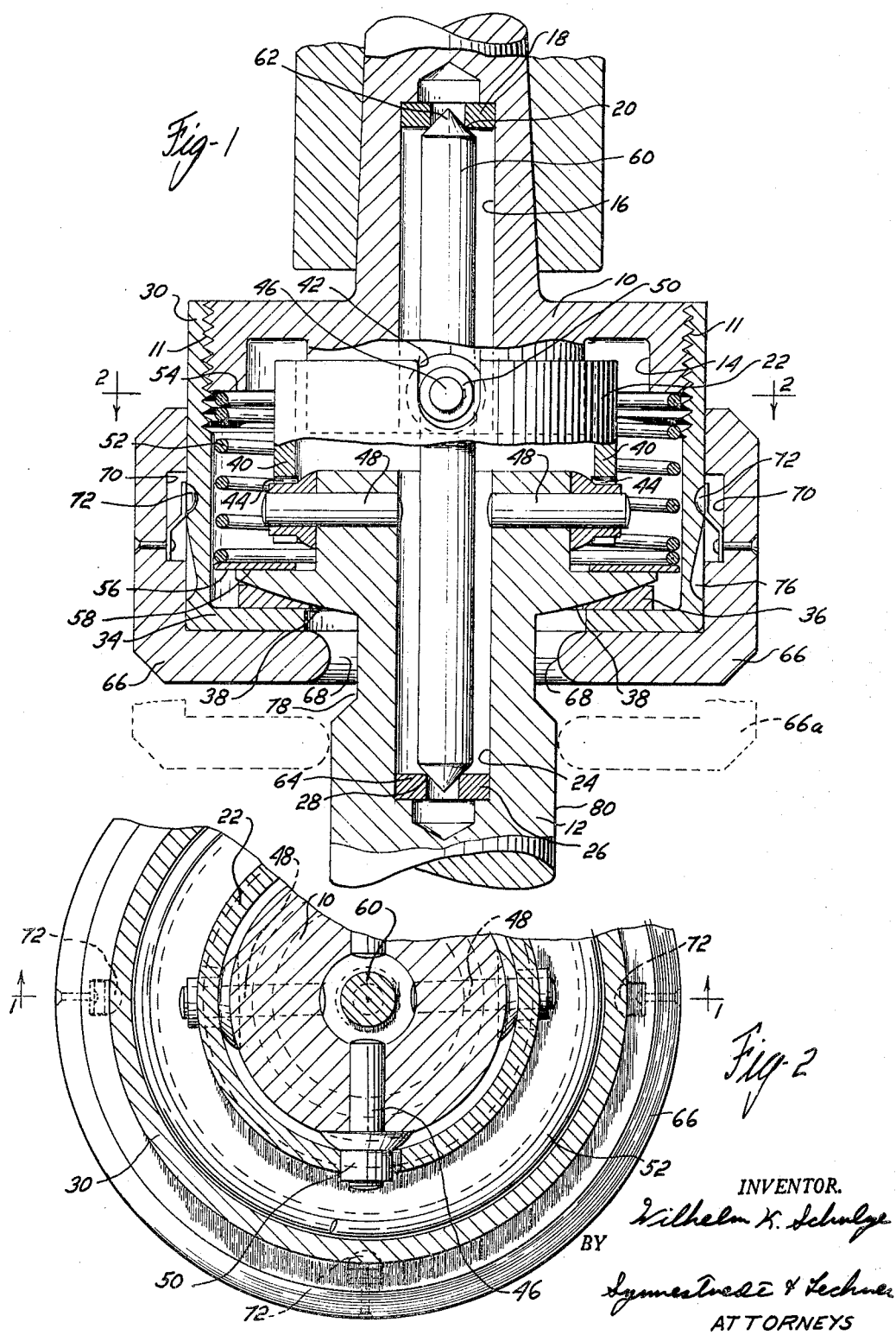

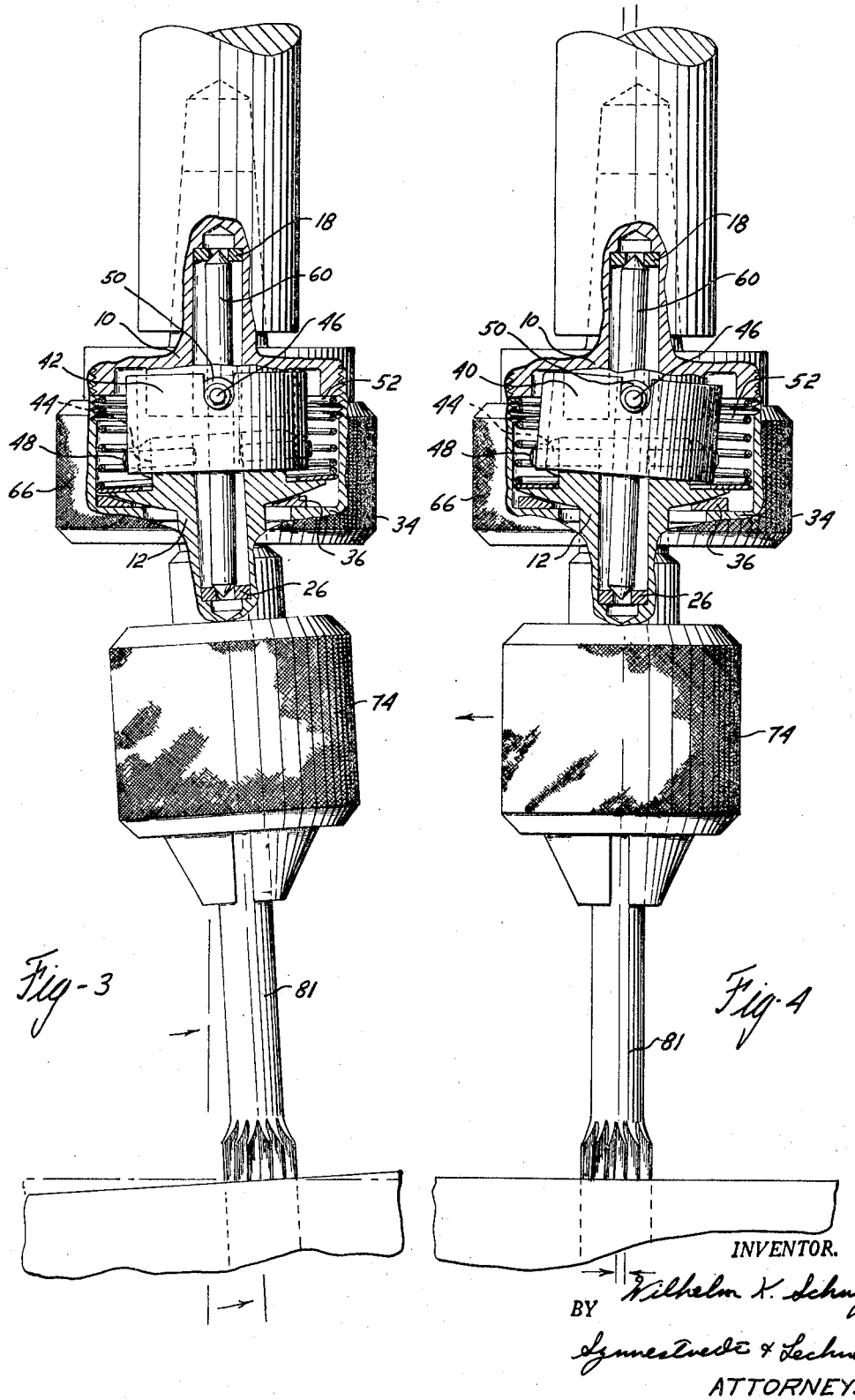

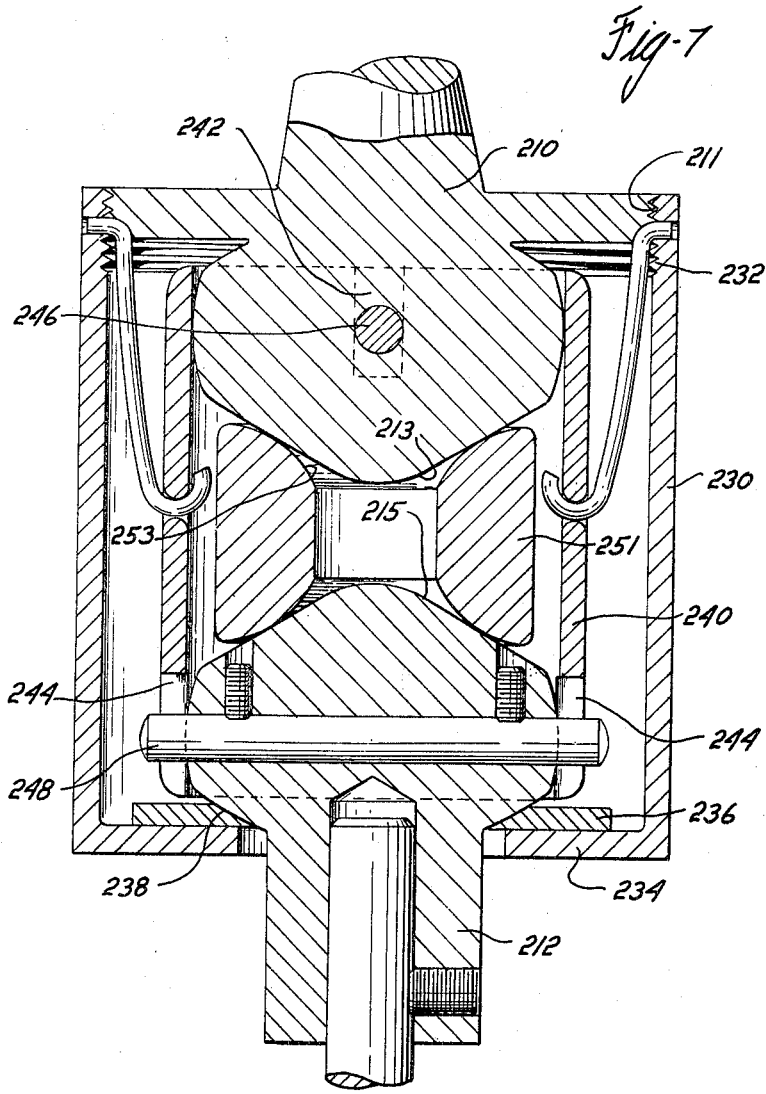

United States Patent Office 3,491,625
Patented Jan. 27, 1970

3,491,625
FLOATING TOOL HOLDER
Wilhelm K. Schulze, Meadowbrook, Pa., assignor to Precision Heat Treatment Company, Inc., Southampton, Pa., a corporation of Pennsylvania
Filed June 29, 1967, Ser. No. 650,073
Int. Cl. B23b 31/04, 43/60
U.S. Cl. 77—60            9 Claims

ABSTRACT OF THE DISCLOSURE

Floating tool holder comprising driving and driven members and having separate means for transmitting driving force from the driving member to the driven member and for assuming thrust loads and spacing the members from each other, a drive transmitting means including a sleeve surrounding end portions of the driving and driven members, the parts providing freedom for angular and parallel misalignment of the driving and driven members. The arrangement further includes a locking mechanism for securing the driving and driven members in alignment with each other, and including abutment means preventing engagement of the locking mechanism except when the driving and driven members are in alignment with each other.

---

This invention relates in general to floating tool holders and more particularly to holders for drilling and reaming tools which provide freedom for the tool to be both angularly and parallely misaligned with respect to the axis of the driving member during rotation.

An object of this invention is to provide for a floating tool holder which creates freedom for the driven member to be parallely, as well as angularly, misaligned while it is being rotated.

Another object is to provide such a structure which operates smoothly and with minimum friction losses.

Another object of this invention is to provide such a structure which is simple and economic to manufacture.

Another object of this invention is to provide for a coupling between two rotatable members which renders one of the members free for parallel and angular misalignment with respect to the other member and wherein rotary motion is transmitted through one member in the coupling and thrust is transmitted through another member in the coupling. Thus, each of these parts may be more efficiently designed, which in turn will result in a longer life for each.

Still another object of this invention is to provide for locking the member which is otherwise free to undergo angular and parallel misalignment and when thus locked it is held rigid with respect to the other member. Such an arrangement lodges in the operator a choice whether or not to make one of the members free for parallel and angular misalignment.

Other objects and a fuller understanding of the invention may be had by referring to the following description and claims, taken in conjunction with the accompanying drawings, in which:

FIG. 1 shows an axial-sectional view of a tool embodying the subject invention;

FIG. 2 is a fragmentary cross-sectional view taken in the plane of line 2—2 of FIG. 1;

FIG. 3 is a side and in part an axial-sectional view of the embodiment shown in FIGS. 1 and 2 which exhibits angular misalignment of the driven member with respect to the driving member;

FIG. 4 is similar to FIG. 3 save that it exhibits parallel misalignment of the driven member with respect to the driving member;

FIG. 5 is an axial-sectional view of another embodiment of the subject invention;

FIG. 6 is a half cross-sectional view taken in the plane of line 6—6 of FIG. 5; and FIG. 7 is an axial-sectional view of still another embodiment of the subject invention.

A preferred embodiment of the subject invention is shown in FIGS. 1–4 inclusive. Referring first to FIG. 1, there is shown a rotatable, externally-threaded drive member 10 and a rotatable, driven member 12. The member 10 has a circular recess 14 formed at one end thereof. A cavity 16 extends axially in the member 10 and has a washer 18 inserted at its top, this washer 18 having its inner edge rounded off as at 20.

There is formed in the rotatable driven member 12 an axially extending cavity 24 which has at its end a washer 26, similar to washer 18, and likewise having at its inner edge a rounded portion as at 28.

An internally threaded, tubular housing 30 is by a threaded connection 11 attached to the rotatable driving member 10. This tubular housing 30 has a flange 34 formed at one end thereof, which flange 34 is adapted to receive a washer 36 thereon. It may be observed that there exists a clearance between the outside edge of washer 36 and the interior surface of housing 30. This washer 36, therefore, is free to slide on the flange 34. An outside portion of rotatable driven member 12 is convexly rounded as at 38 and is complementary to a concavely formed surface on washer 36. Thus, member 12 may pivot or slide on washer 36. This renders the rotatable driven member 12 free to undergo angular misalignment with respect to the axis of the drive member 10. This, together with the freedom of washer 36 to slide on flange 34, renders the driven member 12 free to undergo both parallel and angular misalignment with respect to member 10.

Surrounding an end of the rotatable drive member 10 and an end of rotatable driven member 12 is a tubular member 40 which has two radially aligned slots 42 formed at one end thereof and two radially aligned slots 44, which are perpendicular to slots 42 formed at the other end thereof. In this preferred embodiment, these slots 42 and 44 are perpendicular with respect to each other, but it is to be understood that this is not critical and that these slots may be aligned parallel to each other, as is shown in the embodiment set forth by FIG. 5 and described hereinafter.

It is of course necessary to transmit the rotary motion and generated torque from the member 10 to the member 12. To accomplish this, there are extending through the slots 42 and into bores formed in rotatable driven member 10 pins 46, and extending through slots 44 and into bores formed in rotatable driven member 12 pins 48. These pins 46 and 48 are clearly shown in FIG. 2, and it may be observed that the pins 46 when so placed run perpendicular with respect to pins 48. At one end of pins 46 and 48 are mounted rollers 50 which ride in the slots 42 and 44. These rollers substitute rolling for sliding friction and thus increase the smoothness with which the device operates. The use of rollers 50 decreases wear on pins 46 and 48 and thus increases the life of these pins.

Members 10 and 12 are biased away from each other by spring 52 which rests on a flat portion 54 of member 10 and on washer 56 resting upon a flat portion 58 formed on member 12. This spring 52, it may be observed, presses member 12 against washer 36 and thus tends to maintain member 12 resiliently in alignment with member 10. Housing 30 functions to prevent members 10 and 12 from being separated from each other more than a predetermined distance.

In order to separate members 10 and 12 from each other, while still rendering the latter free with respect to the former to undergo parallel and angular misalignment, there is provided an elongated cylindrical member or pin 60, having conically-shaped ends 62 and 64, lying in cavities 16 and 24 formed in members 10 and 12 respectively. The conically-shaped ends 62 and 64 are in contact with washers 18 and 26 at their rounded inner portions 20 and 28. This arrangement creates a seat for these ends. Thus, it may be observed that the elongated cylindrical member or pin 60 is free to move with respect to washers 18 and 26. It also may be observed from FIG. 1 that the member 60 is of considerable length, speaking relatively to the size of the parts of this device. This structure is desirable because it minimizes the excursion of the points of contact from the axis of the joint, thereby minimizing friction, as compared with such a member which is relatively short in length.

Under some circumstances, an operator might wish that the member 12 not be free to undergo parallel and angular mis-alignment with respect to the member 10. Thus, there is mounted on the outside of housing 30 a cylindrically-shaped locking member 66, having a hole 68 formed in the bottom portion thereof. In cavities 70 formed on the inner wall of the member 66 there are mounted clasps 72 made of spring metal. These clasps 72 are formed so that they may be inserted into a recess formed on the surface of housing 30 in such a way that they lock member 66 in the position shown in FIG. 1. It should be observed that, when member 66 is in this position, which places a recessed portion 78 of rotatable member 12 within hole 68, there is a clearance between members 66 and 12. Thus, member 12 is free to move within member 66. This member 66 is mounted for axial, reciprocating movement on housing 30, and may be moved into the position shown by the dotted lines 66a in FIG. 1. The length of travel of member 66 is limited by the recesses which receive the clasps 72 and the recesses 76 formed in the outer surface of the housing 30. It may be seen that when member 66 is in the position indicated by the dotted-line position 66a, the edge of the hole 68 formed in one end thereof engages the non-recessed portion 80 of rotatable driven member 12. Thus, member 12 is prevented from, and no longer is free to undergo, axial or parallel misalignment with respect to rotatable drive member 10.

It will be observed that the non-recessed portion 80 of the driven member 12 acts as an abutment means preventing movement of the locking member 66 from the release position (shown in full lines in FIGURE 1) to the locking position (shown at 66a in dotted lines in FIGURE 1) in any relative positions of the driving and driven members 10 and 12 except when said members are aligned with each other.

Referring now to FIGS. 3 and 4, these figures exhibit the subject device in operation, FIG. 3 illustrating angular misalignment and FIG. 4 illustrating parallel misalignment of the driving and driven members. In FIGS. 3 and 4, there is attached to the rotatable driven member a chuck 74, which has inserted therein a reamer 81. Rotation of member 10 is transmitted from pins 46 through rollers 50 to tubular member 40, and then to member 12 through rollers 44 and pins 48. Due to the heretofore described structure, the rotatable driven member 12, chuck 74, and reamer 80 are free to become angularly, as well as parallely, misaligned with respect to drive member 10. In connection with FIG. 3, which illustrates angular misalignment, it may be observed that member 12 has pivotally slid on the concavely-shaped portion of washer 36, which itself has slid to the left on flange 34 formed on the bottom of housing 30. The conically-shaped ends of pin 60 also have shifted somewhat in their seats formed by washers 18 and 26. In FIG. 4, which exhibits parallel misalignment, we see again that washer 36 has shifted to the left and that the conically-shaped ends of pin 60 have shifted in their seats in washers 18 and 36.

In FIGS. 5 and 6, there is shown a modification of the structure which maintains the rotatable drive member 10 spaced from the rotatable driven member 12. In the discussion of the device illustrated in these figures, those parts which perform a function similar to parts included in the device illustrated in FIGS. 1–4 will be designated by a number which is 100 greater than the number of a similar part in FIGS. 1–4.

Referring now to FIG. 5, there is shown an externally-threaded, rotatable drive member 110 and a rotatable driven member 112. Surrounding the ends of members 110 and 112 is an internally-threaded housing 130. The housing 130 and the member 110 are threadedly connected as at 111. At the bottom of housing 130 is a flange 134 which extends only far enough to create a clearance between it and the member 112. It may be observed that member 112 rests on washer 136, which in turn is placed upon the flange 134 in the housing 130. The inner edge of the washer 136 is rounded and is complementary to the outside portion 138 of member 112. This relationship between washer 136 and the complementarily rounded portion of member 112 allows the member 112 to undergo various movements, as was discussed heretofore.

Surrounding one end of member 110 and one end of member 112 is a tubular member 140 having radially aligned slots 142 formed in one end thereof and radially aligned slots 144 formed in the other end thereof. It may be observed that, unlike the device illustrated in FIGS. 1–4, the radially aligned slots 142 and 144 run parallel to each other. As previously stated, however, this is not critical. There are formed holes 141 in the surface of tubular member 140 into which is inserted the hook portion of hangers 143, the other ends of which are inserted into holes 145 formed in the surface of housing 130. These hangers function to prevent the force of gravity from causing the tubular member 140 to rest upon the washer 136, and center the member 140 with respect to the pins 146 and 148.

Pins 146 and 148 are located in bores in members 110 and 112 and extends into and through slots 142 and 144 formed in the tubular member 140. These pins are held in place by screws 151. There is attached at the lower end of member 110 a seating ring 153 having a conical seat, and the upper end of member 112 a seating ring 155 having a spherical seat. Resting in the seats in members 153 and 155 as shown are spherical elements 157, which are free to move therein. Inserted between spherical elements 157 is the collar member 159 which has a spherical seat 163 at the bottom and a conical seat 161 at the top. A portion of each of the spherical elements 157 lies in the seats formed in collar member 159. This arrangement maintains members 110 and 112 spaced from each other even when they are parallely or angularly misaligned with respect to each other.

It may be observed that mounted on the outside of the housing 130 is a locking member 166 which is identical in structure and function to the locking member 66 illustrated and described in connection with FIG. 1.

In FIG. 7, there is shown still another embodiment of the subject invention. It may be observed that the structure there shown is like that in FIG. 5 save that the lower portion of the drive member 210 and the upper portion of the driven member 212 are shaped differently, that the pins 246 and 248 are oriented perpendicularly with respect to each other, and that the members 210 and 212 are spaced apart by the donut-like element 251. The lower portion of drive member 210 and the upper portion of driven member 212 have conical surfaces 213 and 215 formed thereon, instead of the conical-spherical combination included in the embodiment shown in FIGS. 5 and 6. The inner edges of donut-like member 251 are rounded off as at 253. These rounded surfaces on element 251 cooperate with the spherical surfaces 213 and 215 on members 210 and 212 respectively. This structure, like the previously described structure, renders rotatable driven member 212 free to undergo both parallel and angular misaligement with respect to rotatable drive member 210. It may also be observed that the spacing member 251 cooperates with conical seating arrangements on members 210 and 212, which seating arrangements protrude in convex fashion from the members 210 and 212. This is unlike the seating arrangements for the spacing element in the embodiments of FIGS. 1-4 and FIGS. 5 and 6, wherein the seating ararngements are within the drive and driven members in a concave fashion.

From the several embodiments described above and illustrated in the drawings, it will be seen that the invention provides a tool of relatively simple construction accommodating both angular and parallel misalignment of a drive and driven member, while also making possible locking out such freedom for angular and parallel misalignment.

It further will be seen that, in all embodiments described, the torque and thrust are isolated from each other, and are handled or carried by separate parts of the device. For example, in FIG. 1, rotary motion and the accompanying torque are transmitted from the rotatable drive member 10 to the rotatable driven member 12 through the member 40, which constitutes a sleeve or cylindrical element surrounding other parts of the assembly. On the other hand, the thrust generated in rotatable driven member 12 when the device is in operation is transmitted, not through member 40, as is true in various prior-art device, but is transmitted through the elements spacing drive member 10 from driven member 12, principally the elongated pin 60.

A sleeve-type element (40 in the embodiment of FIGS. 1-4, 140 in the embodiment of FIGS. 5 and 6, and 240 in the embodiment of FIG. 7) is used as the torque-transmitting element in all forms of the invention illustrated and described. The structure of the mechanism for communicating the thrust between the driving and driven members is, however, different in each embodiment, and the several embodiments demonstrate that both conical and spherical surfaces may be used in various combinations for this purpose.

In the thrust-transmitting mechanism, the elongated pin 60, as previously stated, is the preferred form for the spacing mechanism. It further is preferred that this pin 60 be relatively long, as it is in FIGS. 1-4, because such relatively great length allows reduction in the relative motion, and thus in the friction, of the moving surfaces at the opposite ends thereof. This is so since the relatively great length of the pin 60 permits location of the surfaces 62 and 20 and the surfaces 64 and 28 at the other end of the pin at substantial distances from the center zone or point about which the angular relative motions of the driving and driven members 10 and 12 occur. Indeed, in the arrangement as shown in FIG. 1, the surfaces 64 and 28 at the lower end of the pin 60 are located even below the mean horizontal plane of the spherical surface 38 and the cooperating seat on the washer 36, the surfaces 62 and 20 being located considerably above that plane and also above the center zone or point about which the relative angular motions of the driving and driven members occur.

What is claimed is:

1. A tool comprising in combination a first member adapted to be rotated, a second member adapted to be rotated, means cooperating with said first and second members for transmitting rotary motion from one of said members to the other of said members, means cooperating with said first and second members for spacing one of said members from the other of said members, said transmitting and said spacing means providing freedom for one of said members to be displaced angularly and parallely with respect to the other of said members while they are being rotated, releasible mechanism for locking said members in position substantially aligned with each other, including a locking element mounted on one of said members, the mounting providing for movement of the locking element between a locking position in which the element engages the other of said members and restrains relative angular and parallel misalignment of said members and a release position in which the locking element is disengaged from said other member to provide freedom for relative angular and parallel misalignment of said members, and abutment means projecting from said other member into the path of movement of the locking element from said release position toward said locking position in all relative positions of said two members except when they are substantially aligned with each other.

2. A tool comprising in combination a first member adapted to be rotated, a second member adapted to be rotated, means cooperating with said first and second members for transmitting rotary motion from one of said members to the other of said members, means cooperating with said first and second members for spacing one of said members from the other of said members, said transmitting and said spacing means providing freedom for one of said members to be displaced angularly and parallely with respect to the other of said members while they are being rotated, means cooperating with one of said members for locking that member in axial alignment with the other of said members so that it is restrained as against displacement with respect to the other of said members, the second of said members having a recessed portion and a non-recessed portion displaced axially of each other, and said locking means comprising an element surrounding the second of said members and having a hole therein through which the second of said members extends and which has the same geometric configuration and substantially the same area as the cross section of the non-recessed portion of the second of said members, said element being mounted for movement axially of the second of said members, whereby when the said element surrounds the recessed portion of the second of said members, the second of said members is free to undergo angular and parallel displacement and when the said element surrounds the non-recessed portions, the second of said members is restrained from being displaced.

3. A tool comprising in combination a first member adapted to be rotated, a second member adapted to be rotated, means cooperating with said first and second members for transmitting rotary motion from one of said members to the other of said members, means cooperating with said first and second members for spacing one of said members from the other of said members, said transmitting and said spacing means providing freedom for one of said members to be displaced angularly and parallely with respect to the other of said members while they are being rotated, means cooperating with one of said members for locking that member in axial alignment with the other of said members so that it is restrained as against displacement with respect to the other of said members, the second of said members having a recessed portion and a non-recessed portion displaced axially of each other, and said locking means comprising an element surrounding the second of said members and having an opening therein through which the second of said members extends, which opening has portions the edges of which are so spaced from each other that they are adapted to engage the non-recessed portion and which do not engage the recessed portion of the second of said members, said element being mounted for movement axially of the second of said members, whereby when the said element surrounds the recessed portion of the second of said members, the second of said members is free to undergo angular and parallel displacement and when the said element surrounds the non-recessed portion, the second of said members is restrained from being displaced.

4. A tool comprising in combination a first member adapted to be rotated, a second member adopted to be rotated, means cooperating with said first and second members for transmitting rotary motion from one of said members to the other of said members, means separate from said first means cooperating with said first and second members for spacing one of said members from the other of said members, and providing for transmission of substantialy all the thrust from one to the other of said members, said transmitting and said spacing means providing freedom for one of said members to be displaced angularly and parallely with respect to the other of said members while they are being rotated, the means for transmitting rotary motion comprising a sleeve surrounding one end of the said first member and one end of the said second member and having radially aligned slots in both ends thereof, a pair of drive elements projecting radially from the said one end of the first member extending through the radially aligned slots at one end of the sleeve and a pair of drive elements projecting radially from the said one end of the second member extending through the radially aligned slots in the other end of the sleeve.

5. A tool in accordance with claim 4 wherein the pair of drive elements projecting radially from the said one end of the first member are aligned radially and the pair of drive elements projecting radially from the said one end of the second member are aligned radially and are perpendicular to the drive elements projecting from the drive member.

6. A tool in accordance with claim 4 wherein the pair of drive elements projecting radially from the said one end of the first member are aligned radially and the pair of drive elements projecting radially from the said one end of the second member are aligned radially and are parallel to the drive element projecting from the drive member.

7. A tool comprising in combination a rotatable drive member, a rotatable driven member, drive transmitting means surrounding said drive member and said driven member for transmitting rotary motion from the rotatable drive member to the rotatable driven member, means separate from said first means cooperating with said rotatable drive and rotatable driven members for spacing one of said members from the other of said members and providing for the transmission of substantially all of the thrust from one to the other of said members, said spacing means providing freedom for the driven member to be displaced angularly and parallely with respect to the drive member while they are rotating, and flexible connections between the drive transmitting means and each of said members providing freedom for angular and parallel misalignment of each of said members with respect to the surrounding drive transmitting means.

8. A tool according to claim 7 wherein the said spacing means comprises a first seat formed in said drive member and a second seat formed in said driven member, and an elongated member having conically-shaped ends, which conically-shaped end are seated in the said first and second seats.

9. A tool in accordance with claim 7 wherein said spacing means comprises a first socket formed in the said drive member and a second socket formed in the said driven member, a first spherical element having a portion thereof in the said first socket, a second spherical element having a portion thereof in the said second socket, and a member having sockets formed in both ends thereof and having a portion of each of the spherical elements in those sockets.

References Cited

UNITED STATES PATENTS

| | | | |
|---|---|---|---|
| 1,371,630 | 3/1921 | Kresge | 279—16 |
| 1,398,234 | 11/1921 | Landis. | |
| 2,429,564 | 10/1947 | Petersen | 279—16 |
| 2,475,385 | 7/1949 | Frisco | 279—16 |
| 3,255,670 | 6/1966 | Lasermann | 90—62 |

GERALD A. DOST, Primary Examiner

U.S. Cl. X.R.

64—17; 279—16